United States Patent [19]
Beam

[11] Patent Number: 5,559,755
[45] Date of Patent: Sep. 24, 1996

[54] RANGE FINDING DEVICE AND METHOD

[76] Inventor: Jon P. Beam, 242 Nautilus Dr. #302, New London, Conn. 06320

[21] Appl. No.: 463,000

[22] Filed: May 31, 1995

[51] Int. Cl.$^6$ .................................................... G01S 3/80
[52] U.S. Cl. ............................................. 367/118; 367/124
[58] Field of Search ....................................... 367/118, 124

[56] References Cited

U.S. PATENT DOCUMENTS 5,357,484  10/1994  Bates et al. ................................ 367/118
5,481,505  1/1996  Donald et al. .............................. 367/130

*Primary Examiner*—J. Woodrow Eldred
*Attorney, Agent, or Firm*—Michael J. McGowan; James M. Kasischke; Prithvi C. Lall

[57] ABSTRACT

A method and apparatus for passively determining the range of a radiating source that is in a state of motion with respect to an observer. In one embodiment of the invention the range is determined in accordance with the bearing rate of the radiating source, the bearing acceleration of the radiating source, the frequency of the received radiation, the frequency rate of the received radiation, and the velocity of the radiation through a medium. In another embodiment of the invention the range is determined in accordance with the bearing rate of the radiating source, the bearing acceleration of the radiating source, the fractional frequency rate of the received radiation, and the velocity of the radiation through the medium.

4 Claims, 5 Drawing Sheets

RANGE FINDING DEVICE AND METHOD

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

This invention relates generally to both apparatus and methods for determining the range of a radiating source relative to an observer.

(2) Description of the Prior Art

Range finding is a process whereby the distance between an object and an observer is determined. In general, the object may be a radiating source or may be passive (i.e., an energy reflector). Of particular interest herein is the case where the object is a passive source. Either a passive object or a radiating source may be referred to as a target.

Range finding systems are either active or passive. Active systems typically involve the transmission and reception of electromagnetic energy (radar) or acoustic energy (sonar). A disadvantage of such active range finding systems is that the transmission of such electromagnetic and acoustic energy discloses the position or location of the observing ship that transmits the ranging energy.

Passive sonar merely receives the acoustic energy generated from a distant source and is only capable of giving information on the target bearing and the acoustic frequency generated by the target.

An active sensor system, such as active sonar, can determine the distance to an object directly by forming the product of (1) one half the sound velocity and (2) the time interval from the instant of the transmission of a ping until the instant of the arrival of the ping's echo from the object.

A passive range finding system, such as passive sonar, can determine the direction of a target (radiating source) and the frequency of the radiation. Current techniques of passive ranging require that (1) special conditions pertain or (2) additional information, other than frequency and bearing data supplied by passive sonar, be known or that strong assumptions be made.

Radio direction finding is another type of passive system which determines only the bearing of a source of radio or electromagnetic emission. This is usually accomplished by means of a directive receiving antenna.

There are several other techniques which may be applicable under certain circumstances when the range of an acoustic radiating source is to be determined. Bottom bounce ranging can be used when the bottom depth, gradient and composition are known. Multipath ranging can be used if the temperature profile, at the ocean location in question, is suitable.

Bottom bounce techniques require that (1) the combination of ocean temperature profile, bottom depth and composition, and target range allow reception of such a bounce and, (2) the bottom depth and orientation vector be known in advance with reasonable accuracy. Often a tentative range is calculated from a bottom bounce when the depth is known and a horizontal bottom has been assumed.

Multipath ranging uses signals received from the source by reflection from the surface, reflection from the bottom, and direct transmission. Range is calculated from the delay time between receipt of the signals using the temperature profile, and bottom and surface conditions.

Various prior art range finding apparatus are described in the following documents. In Snowden, U.S. Pat. No. 3,304,409, Feb. 14, 1967, range is determined as a function of the bearing θ of the target from an observing ship, and measurements of the motion of the observing ship. In Olsen, U.S. Pat. No. 3,947,804, Mar. 30, 1976, there is disclosed a range/bearing computer that solves two trigonometric equations which are indicative of the bearing and range of a target or radiating source. The variables used in the equations are the time interval between the arrivals of a wave front at different spaced locations, a constant voltage proportional to the distance of separation of the spaced locations, the velocity of propagation of the wave front, and the angle of inclination formed by the intersection of a line drawn through the spaced locations and a horizontal plane through one of the spaced locations.

None of the known methods or apparatus can directly determine the range to the object of interest, the course and speed or track of the object, or predict the position of the object at a given instant of time without reference to surface or bottom conditions.

SUMMARY OF THE INVENTION

It is therefore an object of the invention to provide an apparatus and method for passively determining the range of a radiating source relative to an observer.

The advantages of the apparatus and method of this invention are that, unlike the conventional techniques of determining the range of an acoustic source, the apparatus and method do not require information resulting from observer course changes or other special information, such as ocean bottom depth or ocean floor topography. The apparatus and method also do not require a favorable bottom composition. The apparatus and method are favored by a temperature gradient appropriate for a direct target to observer propagation path rather than the less common situation where a temperature gradient is present allowing for a bottom bounce propagation path.

A second advantage of this apparatus and method is that, unlike the conventional techniques of determining the range of an electromagnetic source, transmission of electromagnetic energy by the observer is not required since this apparatus and method passively determines range.

Important aspects of the invention are that the frequency of a radiating source, the frequency rate (the rate at which frequency changes with time), the bearing rate, and the bearing acceleration, are used in determining the range of the radiating source, or target, from the observer. The apparatus and method of the invention utilize the velocity of the radiated wave (electromagnetic or acoustic) relative to the medium through which the radiation propagates. The velocity at which electromagnetic and acoustic waves propagate depends on the medium through which the waves propagate. The wave propagation velocity, hereafter referred to as c, can be calculated by many well known methods from data relating to the density of the medium.

In accordance with a first apparatus and method of the invention, the process of determining the range of a radiating source from an observer is accomplished by using the following information: the bearing rate of the radiation source, the bearing acceleration of the radiating source, the frequency of the radiation received from the radiating source, the frequency rate and the radiation velocity. This information is processed such that the result represents the range of the radiating source relative to the observer.

In accordance with a second apparatus and method of the invention, the process of determining the range of a radiating source relative to an observer is accomplished by using the following information: bearing rate of the radiating source, the bearing acceleration of the radiating source, the fractional frequency rate of the radiating source and the radiation velocity.

This invention addresses the common case wherein there is change in both the bearing and the range of the radiating source, or target, relative to the observer. Typically the target and the observer are both in motion. The combination of the separate states of motion of the target and the observer results in a change in the bearing and in the range of the target from the observer. Either the target or the observer but not both can be stationary relative to an absolute coordinate system, such as a geographic coordinate system fixed to the earth for terrestrial applications. The source must radiate some form of periodic radiation, which radiation may be either acoustic, electromagnetic, or gravitational waves.

BRIEF DESCRIPTION OF THE DRAWINGS

A more complete understanding of the invention and many of the attendant advantages thereof will be readily appreciated and better understood by reference to the following detailed description, when considered in conjunction with the accompanying drawings, wherein.

DESCRIPTION OF THE PREFERRED EMBODIMENT

This invention is applicable to the case wherein there exists a continuous relative motion between a radiating source, also referred to as a target, and the observer, such that there is a change in both the bearing and the range of the radiating source relative to the observer. If a radiating source moves in a direction toward or away from a stationary observer, without causing a change in bearing, then the range cannot be determined. Similarly, if the movement of the radiating source results in a bearing change, but not a range change, then range cannot be determined. As an example, if a radiating source is circling an observer then the range cannot be determined because the bearing of the source changes but the range of the source does not change.

The motion of the radiating source relative to the observer need not be purely rectilinear, wherein rectilinear motion is considered to be a motion having a constant speed and direction. In nautical or atmospheric applications for example, the normal incidental variation in course and speed due to atmospheric or oceanic conditions does not make the method unreliable. To obtain a reliable figure for the range from the observer to the source, the first method requires sufficiently accurate estimates of bearing rate, bearing acceleration, frequency, and frequency rate. The alternate method requires accurate estimates of bearing rate, bearing acceleration, and fractional frequency rate. Both methods require that the target maintain an approximately steady course and speed over the time interval of a few cycles of the radiation.

If measurements of bearing and frequency of the radiating source are made at regular intervals of time, then the range can be determined for each measurement period. Averaging the determined range estimates over several measurement periods yields improved range estimates. The source need only maintain approximately rectilinear motion over the duration of the averaging interval.

Figure 1:
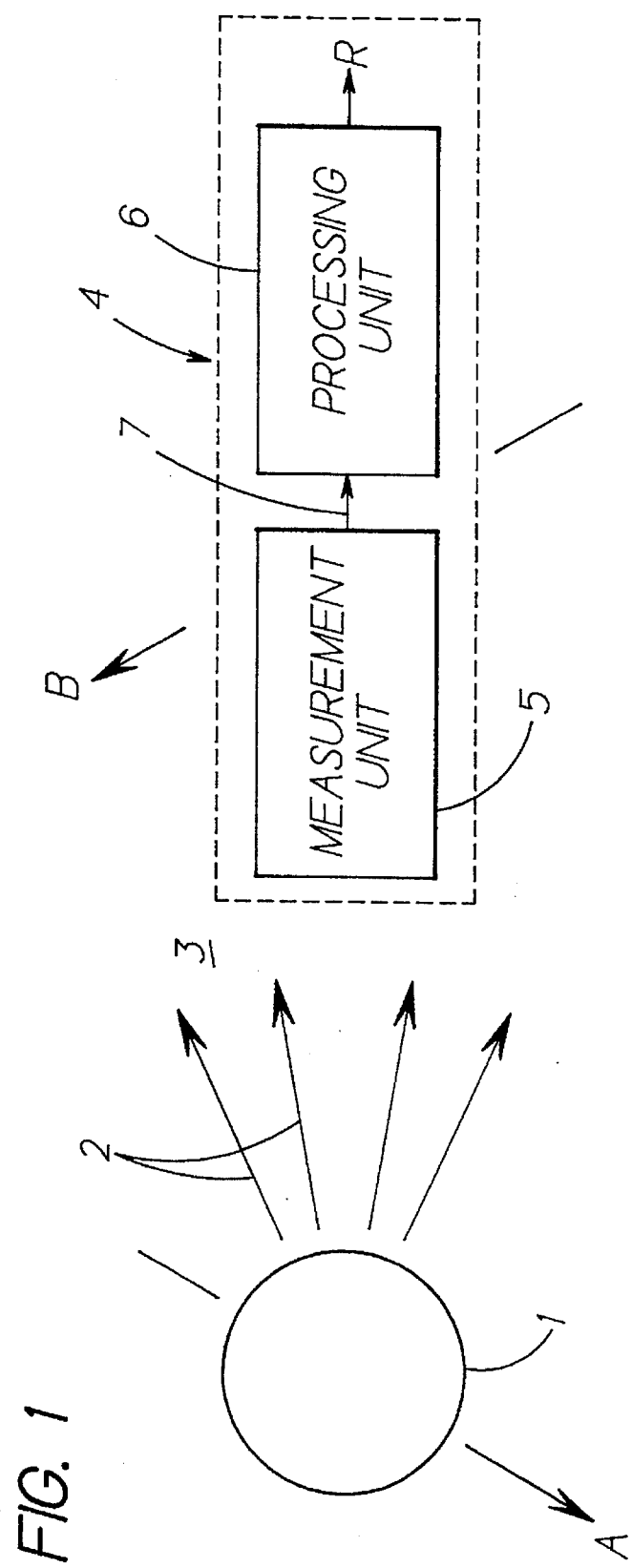
FIG. 1 is a block diagram of an overall range finding system.

As is shown in FIG. 1, a target 1 emits radiation shown here as rays 2 which propagates through a medium 3. By example, medium 3 can be water, air, or a vacuum. An observer 4 includes a measurement unit 5 and a processing unit 6. In FIG. 1, target 1 and observer 4 are shown in motion with respect to one another with the direction of target 1 motion being indicated by an arrow A, and the motion of observer 4 being indicated by an arrow B. Measurement unit 5 is responsive to radiation 2 to provide information expressive of the radiation frequency, the bearing of target 1 with respect to observer 4, and the velocity of radiation 2 through medium 3 to processing unit 6 along data path 7. Processing unit 6 is responsive to the information provided by the measurement unit 5 to provide an estimate of a range r of the target 1 with respect to the observer 4 in accordance with the method and apparatus of the current invention. Both measurement unit 5 and processing unit 6 can include apparatus for smoothing their respective output signals via a moving average or other well known method to eliminate rapid fluctuations in the output data.

Figure 2A:
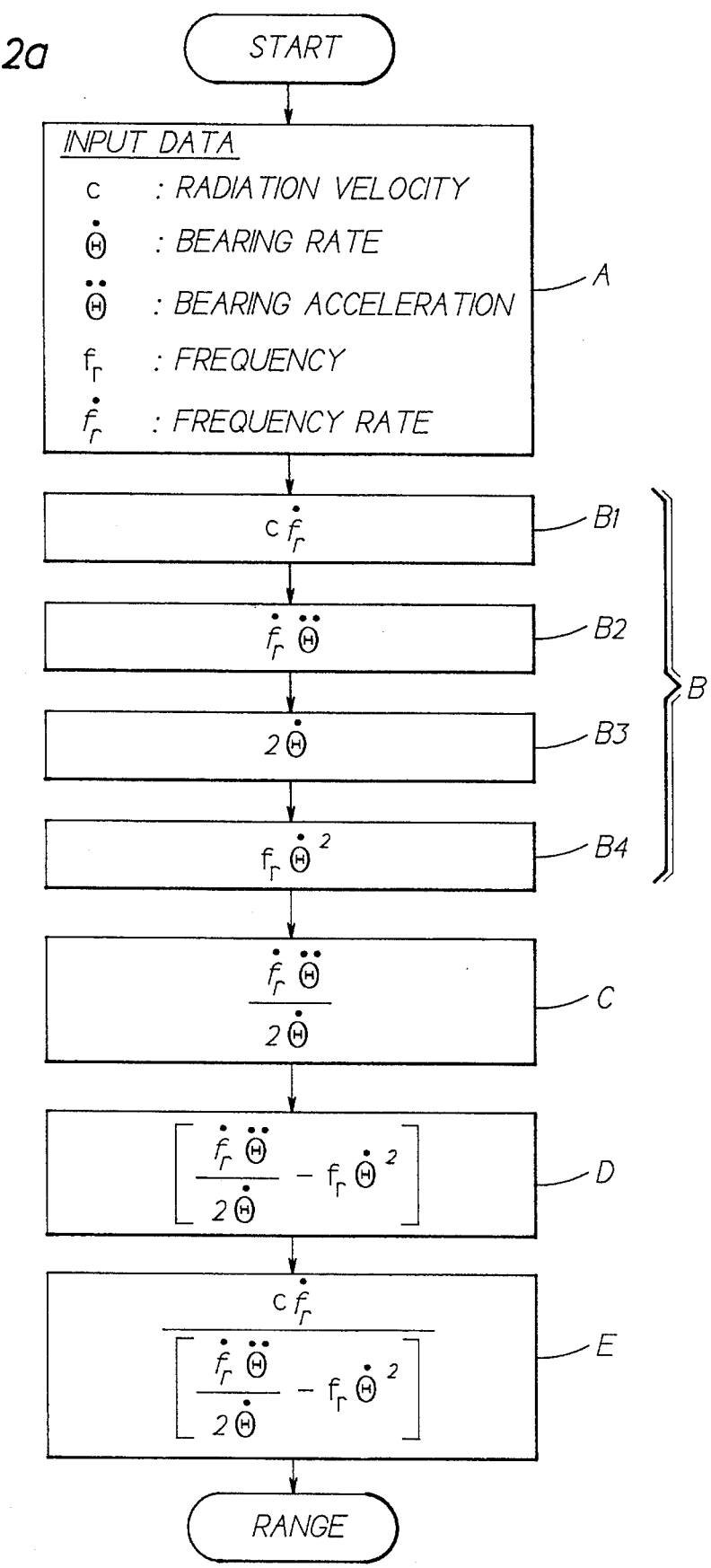
FIG. 2a is a flow chart illustrating a method of the invention using frequency and frequency rate.
Figure 2B:
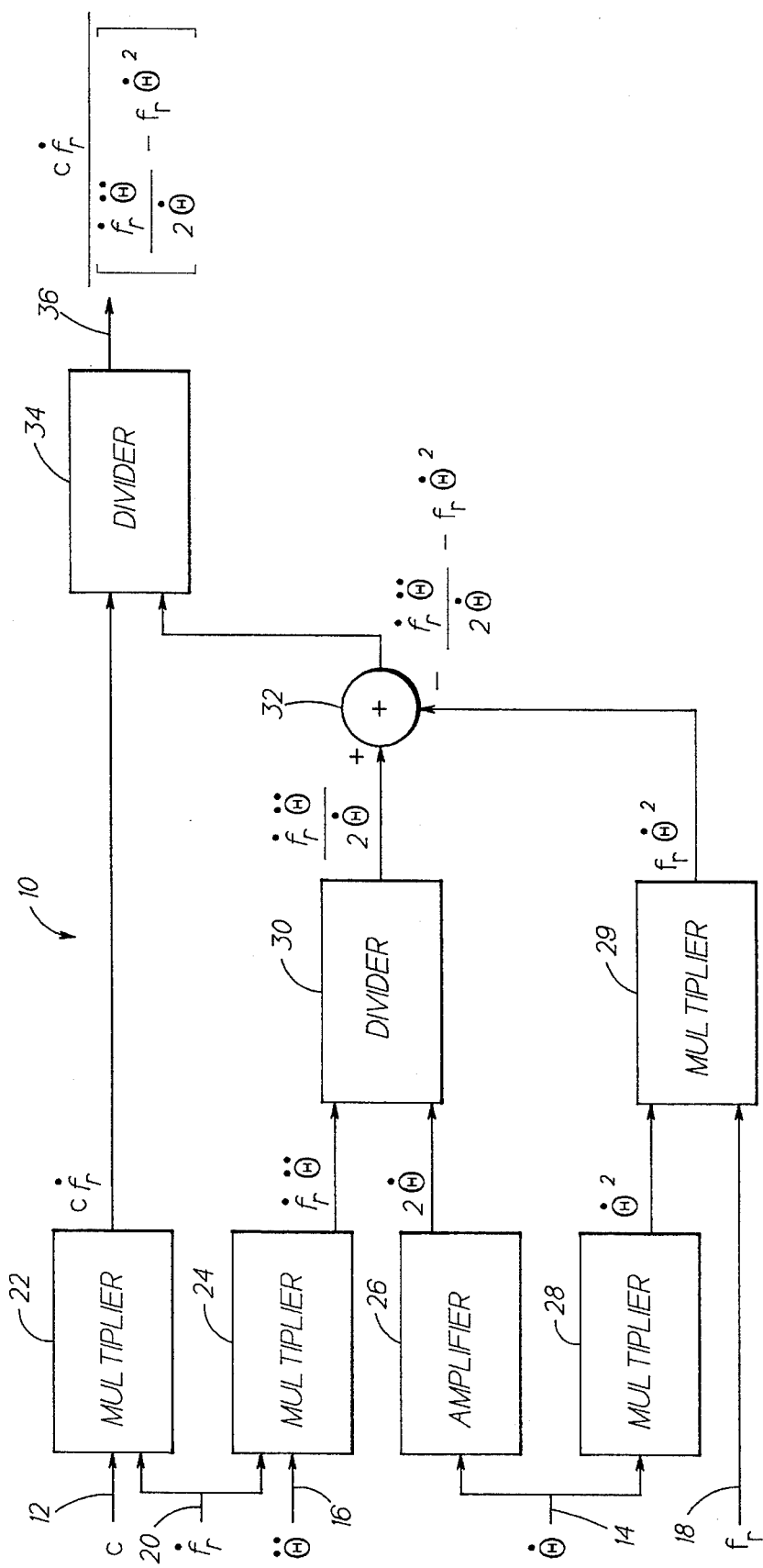
FIG. 2b is a block diagram of an apparatus that utilizes the frequency and the frequency rate of the radiating source to determine range.

The first embodiment of the processing unit 6 of this invention, illustrated in FIGS. 2a and 2b, receives the following input data from the measurement unit 5:

α: the estimate of the radiation velocity in the medium;

θ: the bearing rate (the change in bearing per unit of time);

θ̈: the bearing acceleration (the change in bearing rate per unit of time);

$f_r$: the frequency of the radiation received from the source; and $\dot{f}_r$: the frequency rate (the change in frequency per unit of time).

Figure 3A:
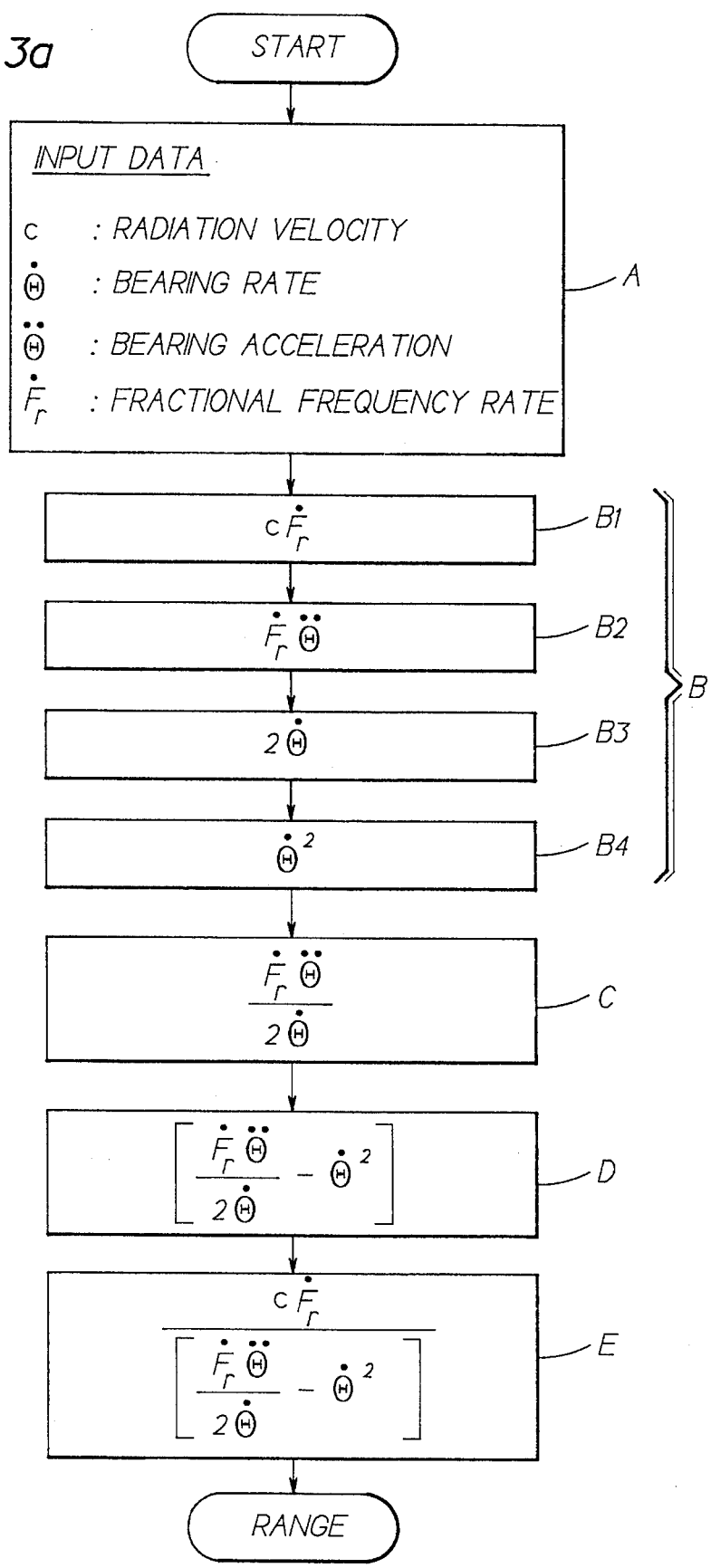
FIG. 3a is a flow chart illustrating an alternate method of the invention using a fractional frequency rate.
Figure 3B:
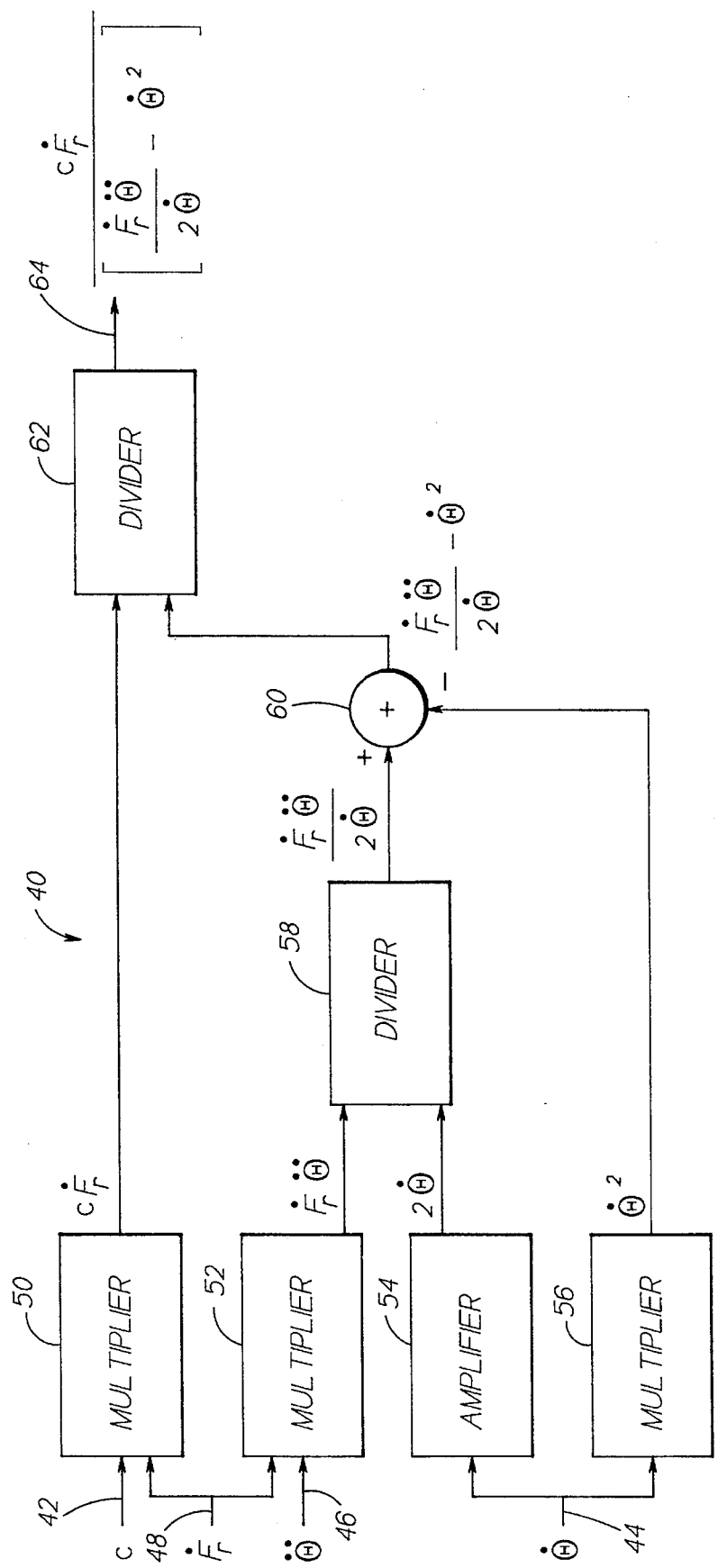
FIG. 3b is a block diagram of an alternate apparatus that utilizes the fractional frequency rate of the radiating source to determine range.

The second embodiment of the processing unit 6, illustrated in FIGS. 3a and 3b, receives the following input data from the measurement unit 5:

α: the estimate of the radiation velocity in the medium;

θ: the bearing rate (as defined above);

θ̈: the bearing acceleration (as defined above); and $\dot{F}_r$: the fractional frequency rate (the frequency rate divided by the frequency of the radiation received from the radiating source).

Important aspects of the invention are (1) the utilization of the frequency and the frequency rate of the received radiation (the embodiment of FIGS. 2a and 2b), and (2) the utilization of the fractional frequency rate of received radiation (the embodiment of FIGS. 3a and 3b). Other equally important aspects of the invention are the utilization, by both embodiments of the invention, of the bearing rate, the bearing acceleration, and the speed of the radiation.

When there is a radial component (i.e., along a line of sight between the source and the observer) to the relative velocity between a radiating source and an observer, the frequency of the radiation seen by the observer will be greater than the radiated frequency if the range is decreasing, and less than the radiated frequency if the range is increasing. The frequency difference, or shift, between the source frequency and the observed frequency that is due to the radial velocity between the source and observer is referred to as a Doppler shift.

The Doppler frequency shift is expressed as $$\Delta f = \frac{V_r}{\lambda} = \frac{f_t V_r}{c}, \quad (1)$$

where $V_r$ is the radial velocity of the radiating source and the observer, $\lambda$ is the wavelength of the transmitted radiation, $f_t$ is the frequency of the transmitted radiation, and c is the speed of the wave relative to the medium. Therefore, the frequency $f_r$ received by the observer is expressed as $$f_r = f_t \pm \frac{f_t V_r}{c}, \quad (2)$$

wherein the plus sign is applicable to a radiation source and an observer that are approaching one another, and the minus sign is applicable to a radiating source and an observer that are moving away from one another. Because of the Doppler effect, the frequency of the received radiation changes per unit of time. Therefore, the frequency rate is expressed as $$\dot{f}_r = \frac{\Delta f_r}{\Delta t} = \frac{f_{r2} - f_{r1}}{t_2 - t_1}, \quad (3)$$

where $\Delta f_r/\Delta t$ equals the change in the received frequency of the radiating source per unit time;

$f_{r1}$ is the frequency of the received radiation at $t_1$; and $f_{r2}$ is the frequency of the received radiation at $t_2$ and is greater than or less than $f_{r1}$ due to the Doppler effect.

A Doppler frequency shift appears if there is a radial motion between a source and the observer. However, the existence of a Doppler shift, in and of itself, is not a sufficient condition for the operation of the apparatus and method of this invention. There must also exist a bearing rate $\theta$ (motion across the line of sight) and a bearing acceleration $\ddot{\theta}$. A constant velocity motion across the line of sight guarantees a bearing acceleration. In the case where the source is moving in a circle about the observer, there is no bearing acceleration, but the source velocity is constantly changing in direction.

The first method illustrated in the flow chart of FIG. 2a, and the corresponding apparatus illustrated in FIG. 2b, utilize the frequency $f_r$ and the frequency rate $\dot{f}_r$ in determining the range of the radiating source relative to the observer.

At Block A of FIG. 2a there is provided a set of input data. The set of input data is comprised of the velocity c of the radiation relative to the medium, the bearing rate $\dot{\theta}$ of the radiating source, the bearing acceleration $\ddot{\theta}$ of the radiating source, the frequency $f_r$ of the received radiation, and the frequency rate $\dot{f}_r$ of the radiating source.

At Block B the following sub-steps are performed: (B1) multiply c times $\dot{f}_r$ to form $c\dot{f}_r$; (B2) multiply $\dot{f}_r$ times $\ddot{\theta}$ to form $\dot{f}_r \ddot{\theta}$; (B3) multiply $\dot{\theta}$ times 2 to form $2\dot{\theta}$; and (B4) multiply $\dot{\theta}$ times $\dot{\theta}$ form $\dot{\theta}^2$, then multiply $f_r$ times $\dot{\theta}^2$ to form $f_r \dot{\theta}^2$. Of course, certain of these sub-steps can be executed in other than the order shown while still obtaining the same results.

At Block C the method divides $\dot{f}_r \ddot{\theta}$ (formed in sub-step B2) by $2\dot{\theta}$ (formed in sub-step B3) to form $\dot{f}_r \ddot{\theta}/(2\dot{\theta})$.

At Block D the method subtracts $f_r \dot{\theta}^2$ from $\dot{f}_r \ddot{\theta}/(2\dot{\theta})$ to form $$\left[ \frac{\dot{f}_r \ddot{\theta}}{2\dot{\theta}} - f_r(\dot{\theta})^2 \right]. \quad (4)$$

At Block E the following operation is performed on the quantities formed thus far to give:

$$\frac{c\dot{f}_r}{\left[ \frac{\dot{f}_r \ddot{\theta}}{2\dot{\theta}} - f_r(\dot{\theta})^2 \right]}. \quad (5)$$

The result is the range r of the radiating source relative to the observer. If desired, an optional smoothing process can be applied to the range r.

In this case, the quantities representing the frequency rate, the bearing rate, and the bearing acceleration can be subjected to a smoothing process to decrease or eliminate rapid fluctuations in the data.

FIG. 2b is a block diagram of an embodiment of a range finder system or apparatus 10 that operates in accordance with the method illustrated in the flow chart of FIG. 2a. The range finder apparatus 10 of FIG. 2b is realizable as a mechanical device, an electrical device, or a digital device such as a microprocessor. In FIGS. 2b and 3b, the term "amplifier" is used expressly to identify a device increasing a variable input by a constant amount, whereas the term "multiplier" is used to identify a device multiplying two variable inputs; however, it is acknowledged that the same type of device could be utilized in both instances. The data inputs include a radiation velocity input 12 receiving the velocity c of the radiation relative to the medium, a bearing rate input 14 receiving bearing rate $\dot{\theta}$ of the radiating source, a bearing acceleration input 16 receiving bearing acceleration $\ddot{\theta}$ of the radiating source, a radiation frequency input be receiving the frequency $f_r$ of the received radiation, and a radiation frequency change rate input 20 receiving the frequency rate $\dot{f}_r$ of the radiating source. Data inputs 12, 14, 16, 18 and 20 can be expressed in either a digital representation or an analog representation. Analog data can be converted to digital data or vice versa by well known means if the form of the input data is different from the form of the data required by the processing apparatus.

A first multiplier 22 is provided to receive radiation velocity input 12 and multiply input 12 with radiation frequency change rate input 20 to obtain $c\dot{f}_r$. A second multiplier 24 is provided to multiply frequency change rate input 20 carrying $\dot{f}_r$ with bearing acceleration input 16 carrying $\ddot{\theta}$ to generate a signal of the magnitude $\dot{f}_r \ddot{\theta}$. An amplifier 26 doubles bearing rate input 14 thereby generating an output of the magnitude $2\dot{\theta}$ A third multiplier 28 receives bearing rate input 14 and squares the input to generate an output having magnitude $\dot{\theta}^2$. Third multiplier 28 output is connected to one input of a fourth multiplier 29. The other input of fourth multiplier 29 receives a signal of magnitude $f_r$ from radiation frequency input 18 and multiplies the inputs to each other to obtain $f_r \dot{\theta}^2$. A first divider 30 is provided to receive the output from second multiplier 24 and the output from amplifier 26 and divide the second multiplier 24 output by amplifier output 26 to form an output of the magnitude $\dot{f}_r \ddot{\theta}/(2\dot{\theta})$. A subtractor 32 is provided to subtract the output of fourth multiplier 29 from the output of first divider 30 to generate an output signal having magnitude equal to:

$$\frac{\dot{f}_r \ddot{\theta}}{2\dot{\theta}} - f_r \dot{\theta}^2. \quad (6)$$

A second divider 34 is provided to receive the output from first multiplier 22 and the output from subtractor 32 to divide first multiplier 22 output by subtractor 32 output to generate a range output 36 of magnitude, $$\frac{c\dot{f}_r}{\left[\frac{\dot{f}_r\ddot{\theta}}{2\dot{\theta}} - f_r(\dot{\theta})^2\right]} \quad (7)$$

Output 36 is representative of the range between the target and the observer. If desired, an optional smoothing process can be applied to output 36, as described previously.

The alternate method illustrated in the flow chart of FIG. 3a and the apparatus illustrated in FIG. 3b utilize the fractional frequency rate $\dot{F}_r$ instead of the frequency $f_r$ and the frequency rate $\dot{F}_r$. Using the fractional frequency rate is advantageous when the apparatus and method of the invention is employed with certain types of existing shipboard equipment that output the fractional frequency rate, instead of the frequency and frequency rate. The fractional frequency rate is expressed as $$\dot{F}_r = \frac{\frac{\Delta f_r}{\Delta t}}{f_r} \quad (8)$$

The second method illustrated in the flow chart of FIG. 3a, and the corresponding apparatus illustrated in FIG. 3b, utilize the fractional frequency rate $\dot{F}_r$ in determining the range of the radiating source relative to the observer.

At Block A of FIG. 3a there is provided a set of input data. The set of input data is comprised of the velocity c of the radiation relative to the medium, the bearing rate $\dot{\theta}$ of the radiating source, the bearing acceleration $\ddot{\theta}$ of the radiating source, and the fractional frequency rate $\dot{F}_r$ of the radiating source.

At Block B the following sub-steps are performed: (B1) multiply c times $\dot{F}_r$ to form $c\dot{F}_r$; (B2) multiply $\dot{F}_r$ times $\ddot{\theta}$ to form $\dot{F}_r\ddot{\theta}$; (B3) multiply $\dot{\theta}$ times 2 to form $2\dot{\theta}$; and (B4) square $\dot{\theta}$ to form $\dot{\theta}^2$. As before, certain of these steps can be executed in other than the order shown while still obtaining the same results.

At Block C the second method divides $\dot{F}_r\ddot{\theta}$ (formed in sub-step B2) by $2\dot{\theta}$ (formed in sub-step B3) to form $\dot{F}_r\ddot{\theta}/(2\dot{\theta})$.

At Block D the method subtracts $\dot{\theta}^2$ from $\dot{F}_r\ddot{\theta}/(2\dot{\theta})$ to form $$\left[\frac{\dot{F}_r\ddot{\theta}}{2\dot{\theta}} - \dot{\theta}^2\right]. \quad (9)$$

At Block E the following operation is performed on the quantities formed thus far:

$$\frac{c\dot{F}_r}{\left[\frac{\dot{F}_r\ddot{\theta}}{2\dot{\theta}} - \dot{\theta}^2\right]}. \quad (10)$$

The result is the range r of the radiating source relative to the observer. If desired, an optional smoothing process can be applied to the range r.

The quantities representing the frequency rate, the bearing rate, and the bearing acceleration can be subjected to an optional smoothing process, such as a moving average, to decrease or eliminate rapid fluctuations in the data.

FIG. 3b is a block diagram of an embodiment of a range finder system or apparatus 46 that operates in accordance with the method illustrated in the flow chart of FIG. 3a. As with the embodiment of FIG. 2b, the range finder apparatus 46 of FIG. 3b is realizable as a mechanical device, an electrical device, or a processing device such as a microprocessor. The data inputs include a radiation velocity input 42 receiving the velocity c of the radiation relative to the medium, a bearing rate input 44 receiving bearing rate $\dot{\theta}$ of the radiating source, a bearing acceleration input 46 receiving bearing acceleration $\ddot{\theta}$ of the radiating source, a radiation fractional frequency input 48 receiving the fractional frequency rate $\dot{F}_r$ of the radiating source. As with the embodiment of FIG. 2b, data inputs 42, 44, 46, and 48 can be expressed in either a digital representation or an analog representation, and suitable conversion means are employed as required in the signal processing blocks.

A first multiplier 56 is provided to receive radiation velocity input 42 and multiply input 42 with radiation fractional frequency input 48 to obtain $c\dot{F}_r$. A second multiplier 52 is provided to multiply radiation fractional frequency input 48 carrying $\dot{F}_r$ with bearing acceleration input 46 carrying $\ddot{\theta}$ to generate a signal of the magnitude $\dot{F}_r\ddot{\theta}$. An amplifier 54 doubles bearing rate input 44 thereby generating an output of the magnitude $2\dot{\theta}$. A third multiplier 56 receives bearing rate input 14 and squares the input to generate an output having magnitude $\dot{\theta}^2$. A first divider 58 is provided to receive the output from second multiplier 52 and the output from amplifier 54 and divide the second multiplier 52 output by amplifier 54 output to form an output of the magnitude $\dot{F}_r\ddot{\theta}/(2\dot{\theta})$. A subtractor 60 is provided to subtract the output of third multiplier 56 from the output of first divider 58 to generate an output signal having magnitude equal to:

$$\frac{\dot{F}_r\ddot{\theta}}{2\dot{\theta}} - \dot{\theta}^2. \quad (11)$$

A second divider 62 is provided to receive the output from first multiplier 50 and the output from subtractor 60 to divide first multiplier 50 output by subtractor 60 output to generate a range output 64 of magnitude, $$\frac{c\dot{F}_r}{\left[\frac{\dot{F}_r\ddot{\theta}}{2\dot{\theta}} - \dot{\theta}^2\right]}. \quad (12)$$

Output 64 is representative of the range between the target and the observer. If desired, an optional smoothing process can be applied to the range r, as described previously.

The range finding apparatus and methods described above may be modified while still achieving a substantially identical result. Thus, it should be realized that those having ordinary skill in the art may derive modifications to the embodiments of the invention disclosed above. The invention is therefore not to be construed to be limited only to these disclosed embodiments, but it is instead intended to be limited only as defined by the breadth and scope of the appended claims.

What is claimed is:

1. A method for determining a range of a radiating source relative to an observer, the radiating source being in a state of motion relative to the observer, comprising the steps of:

providing a bearing rate $\dot{\theta}$ over a plurality of time periods;
providing a bearing acceleration $\ddot{\theta}$ over a plurality of time periods;

providing a frequency $f_r$ of the radiating source over a plurality of time periods;

providing a frequency rate $\dot{f}_r$ over a plurality of time periods;

providing a velocity c of the radiation relative to a medium through which said radiation propagates over a plurality of time periods; and determining the range r of said radiating source relative to said observer in accordance with the expression:

$$\frac{c\dot{f}_r}{\left[\dfrac{f_r\ddot{\theta}}{2\dot{\theta}} - \dot{f}_r(\dot{\theta})^2\right]}.$$

2. A method for determining a range of a radiating source relative to an observer, the radiating source being in a state of motion relative to the observer, comprising the steps of:

providing a bearing rate $\dot{\theta}$ over a plurality of time periods;

providing a bearing acceleration $\ddot{\theta}$ over a plurality of time periods;

providing a fractional frequency rate $\dot{F}_r$ over a plurality of time periods;

providing a velocity c of the radiation relative to a medium through which said radiation propagates over a plurality of time periods; and determining the range r of said radiating source relative to said observer in accordance with the expression:

$$\frac{c\dot{F}_r}{\left[\dfrac{\dot{F}_r\ddot{\theta}}{2\dot{\theta}} - (\dot{\theta})^2\right]}.$$

3. A device for determining a range of a radiating source relative to an observer, the radiating source being in a state of motion relative to the observer comprising:

a measurement unit detecting a bearing rate $\dot{\theta}$, a bearing acceleration $\ddot{\theta}$, a fractional frequency $\dot{F}_r$ of the radiating source, and information relating to a velocity of the radiation relative to a medium through which the radiation propagates over a plurality of time periods;

a processing unit joined to said measurement unit for receiving measured data, said processing unit comprising:

a first multiplier having a first input, a second input, and a first multiplier output, said first multiplier being provided to receive said radiation velocity at said first input and said fractional frequency rate $\dot{F}_r$ at said second input and multiply said first and second inputs for output by said first multiplier output;

a second multiplier having a third input, a fourth input, and a second multiplier output, said second multiplier being provided to receive said fractional frequency rate $\dot{F}_r$ at a third input and said bearing acceleration $\ddot{\theta}$ at a fourth input and multiply said third input and said fourth inputs for output by said second multiplier output;

an amplifier having an amplifier input and an amplifier output, said amplifier being provided to receive said bearing rate $\dot{\theta}$ at said amplifier input and double said amplifier input for output by said amplifier output;

a third multiplier having a fifth input and a third multiplier output, said third multiplier being provided to receive said bearing rate $\dot{\theta}$ at said fifth input and multiply said fifth input by itself for output by said third multiplier output;

a first divider having a first dividend input connected to said second multiplier output, a first divisor input connected to said amplifier output, and a first divider output, said first divider being provided to receive said second multiplier output at said first dividend input and said amplifier output at said first divisor input and divide said first dividend input by said first divisor input for output by said first divider output;

a subtractor having a minuend input connected to said first divider output, a subtrahend input connected to said third multiplier output, and a subtractor output, said subtractor being provided to subtract said subtrahend input from said minuend input for output by said subtractor output; and a second divider having a second dividend input connected to said first multiplier output, a second divisor input connected to said subtractor output, said second divider being provided to divide said second dividend input by said second divisor output to provide a signal representing a range at said second divider output.

4. A device for determining a range of radiating source relative to an observer, the radiating source being in a state of motion relative to the observer comprising:

a measurement unit detecting a bearing rate $\dot{\theta}$, a bearing acceleration $\ddot{\theta}$, a frequency $f_r$ and a frequency rate $\dot{f}_r$ of the radiating source, and information relating to a velocity of the radiation relative to a medium through which the radiation propagates over a plurality of time periods;

a processing unit joined to said measurement unit for receiving measured data, said processing unit comprising:

a first multiplier having a first input, a second input, and a first multiplier output, said first multiplier receiving said radiation velocity at said first input and said frequency rate $\dot{f}_r$ at said second input and multiply said first and second inputs for output by said first multiplier output;

a second multiplier having a third input, a fourth input, and a second multiplier output, said second multiplier being provided to receive said frequency rate $\dot{f}_r$ at said third input and said bearing acceleration $\ddot{\theta}$ at a fourth input and multiply said third input and said fourth inputs for output by said second multiplier output;

an amplifier having an amplifier input and an amplifier output, said amplifier being provided to receive said bearing rate $\dot{\theta}$ at said amplifier input and double said amplifier input for output by said amplifier output;

a third multiplier having a fifth input and a third multiplier output, said third multiplier being provided to receive said bearing rate $\dot{\theta}$ at said fifth input and multiply said fifth input by itself for output by said third multiplier output;

a first divider having a first dividend input connected to said second multiplier output, a first divisor input connected to said amplifier output, and a first divider output, said first divider being provided to receive said second multiplier output at said first dividend input and said amplifier output at said first divisor input and divide said first dividend input by said first divisor input for output by said first divider output;

a fourth multiplier having a sixth input connected to said third multiplier output, a seventh input receiving said radiation frequency $f_r$, and a fourth multiplier output, said fourth multiplier being provided to multiply said sixth input by said seventh input for output by said fourth multiplier output;

a subtractor having a minuend input connected to said first divider output, a subtrahend input connected to said fourth multiplier output, and a subtractor output, said subtractor being provided to subtract said subtrahend input from said minuend input for output by said subtractor output; and a second divider having a second dividend input connected to said first multiplier output, a second divisor input connected to said subtractor output, said second divider being provided to divide said second dividend input by said second divisor output to provide a signal representing a range at said second driver output.

* * * * *